US012737928B2

(12) United States Patent
Suto et al.

(10) Patent No.: US 12,737,928 B2
(45) Date of Patent: Sep. 15, 2026

(54) VISUALIZING REAL WORLD SENTIMENTS OF OBJECTS AND INTERACTIONS VIA AUGMENTED REALITY

(71) Applicant: INTERNATIONAL BUSINESS MACHINES CORPORATION, Armonk, NY (US)

(72) Inventors: Tiberiu Suto, Franklin, NY (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 18/063,277

(22) Filed: Dec. 8, 2022

(65) Prior Publication Data

US 2024/0193820 A1 Jun. 13, 2024

(51) Int. Cl.

| | |
|---|---|
| ***G06F 3/00*** | (2006.01) |
| ***G06F 3/01*** | (2006.01) |
| ***G06T 11/00*** | (2006.01) |

(52) U.S. Cl.

CPC .............. *G06T 11/00* (2013.01); *G06F 3/013* (2013.01)

(58) Field of Classification Search

None

See application file for complete search history.

(56) References Cited

U.S. PATENT DOCUMENTS

| | | | | |
|---|---|---|---|---|
| 9,824,698 | B2 | 11/2017 | Jerauld | |
| 11,250,263 | B2 | 2/2022 | Asbun | |
| 2017/0117005 | A1* | 4/2017 | Jerauld | G10L 25/63 |
| 2017/0337476 | A1* | 11/2017 | Gordon | H04N 21/44231 |
| 2017/0339338 | A1* | 11/2017 | Gordon | G06F 3/012 |
| 2018/0211112 | A1* | 7/2018 | Asbun | G02B 27/017 |
| 2019/0096135 | A1* | 3/2019 | Dal Mutto | G06F 18/24765 |
| 2019/0321643 | A1 | 10/2019 | Sohn | |

(Continued)

OTHER PUBLICATIONS

Almansoori, et al., “A Brief Review on e-Skin and Its Multifunctional Sensing Applications,” Bentham Science, Current Smart Materials, 2019, 4, pp. 3-14, Accepted Feb. 26, 2019, Retrieved from the Internet: <https://www.eurekaselect.com/article/97292>.

(Continued)

*Primary Examiner* — Martin Mushambo

(74) *Attorney, Agent, or Firm* — Andre L. Adkins

(57) ABSTRACT

Techniques are described with respect to a system, method, and computer product for visualizing real world sentiments of an inanimate object. An associated method includes receiving sensor data from a plurality of sensors associated with the inanimate object, the sensor data tracking one or more conditions of the inanimate object; analyzing the sensor data to determine a status of a real world sentiment associated with the inanimate object; and based on the determination, generating, an augmented reality based visualization associated with the inanimate object, the augmented reality based visualization including at least one indicator of the status. The method further including generating a feedback associated with the inanimate object including the at least one indicator for a user; and transmitting the feedback to a wearable device of the user.

20 Claims, 6 Drawing Sheets

(56) References Cited

U.S. PATENT DOCUMENTS

| | | | | |
|---|---|---|---|---|
| 2019/0391638 | A1 | 12/2019 | Khaderi | |
| 2021/0024078 | A1 | 1/2021 | Dede | |
| 2022/0281617 | A1* | 9/2022 | Morita | G06V 10/141 |
| 2023/0059399 | A1* | 2/2023 | Chaudhary | G06V 40/28 |
| 2023/0394751 | A1* | 12/2023 | Jayatunga | G06T 7/579 |

OTHER PUBLICATIONS

Ramirez, "Cars Will Soon Be Able to Sense and React to Your Emotions," Singularityhub.com, Jul. 29, 2020, [accessed Sep. 16, 2022], 5 pgs. Retrieved from the Internet: <https://singularityhub.com/2020/07/29/what-if-cars-could- read-and-react-to-your-emotions-soon-they-will/>.

Smarteye Blog, "The Bondurant Study: How Biometric Data Can Make Us Better Drivers," Smarteye.se, Oct. 19, 2021, [accessed Sep. 16, 2022], 6 pgs., Retrieved from the Internet: <https://smarteye.se/blog/the-bondurant-study-how-biometric-data-can-make-us-better-drivers/>.

Teyssier, et al., "Skin-On Interfaces: A Bio-Driven Approach for Artificial Skin Design to Cover Interactive Devices," UIST '19, ACM, Oct. 20-23, 2019, 16 pgs.

Zijderveld, "The World's Largest Emotion Database: 5.3 Million Faces and Counting," Affectiva.com, Apr. 14, 2017, [accessed Sep. 16, 2022], 14 pgs., Retrieved from the Internet: <https://blog.affectiva.com/the-worlds-largest-emotion-database-5.3-million-faces-and-counting>.

Zijderveld, et al., "The Next Generation of AI-Enabled Cars Will Understand You," Spectrum.ieee.org, Nov. 8, 2021, [accessed Sep. 16, 2022], 21 pgs., Retrieved from the Internet: <https://spectrum.ieee.org/driver-assistance-package>.

* cited by examiner

VISUALIZING REAL WORLD SENTIMENTS OF OBJECTS AND INTERACTIONS VIA AUGMENTED REALITY

FIELD

This disclosure relates generally to field of augmented reality, and more particularly to projecting real world sentiments of objects via augmented reality.

BACKGROUND

Inanimate objects, such as homes, vehicles, and other worldly possessions have the tendency to require repairing, maintaining, upgrading, etc. Indicators of the inanimate objects are a prime mechanism for an individual to ascertain overall state, applicable conditions, what is currently required of inanimate objects (such as required maintenance), etc.

Augmented reality (AR) is an interactive experience combining virtual elements, with a real world environment where the objects that reside in the real world are enhanced by computer-generated perceptual information, sometimes across multiple sensory modalities, including visual, auditory, haptic, somatosensory, and olfactory. AR can be defined as a system that fulfills a combination of real and virtual worlds, real-time interaction, and accurate 3D registration of virtual and real objects. The overlaid sensory information can add to the natural environment and/or mask components of the natural environment in performing various functionality. The AR experience can be seamlessly interwoven with the physical world such that it is perceived as an immersive aspect of the real environment. In this way, augmented reality alters one's ongoing perception of a real world environment. With the assistance of advanced AR technologies, the information about the surrounding real world of the user becomes interactive, and information about the environment and its objects is overlaid on the real world.

SUMMARY

Additional aspects and/or advantages will be set forth in part in the description which follows and, in part, will be apparent from the description, or may be learned by practice of the invention.

Embodiments relate to a system, method, and computer product for visualizing real world sentiments of an inanimate object. In some embodiments, the computer-implemented method for visualizing real world sentiments of an inanimate object includes receiving sensor data from a plurality of sensors associated with the inanimate object, the sensor data tracking one or more conditions of the inanimate object; analyzing the sensor data to determine a status of a real world sentiment associated with the inanimate object; and based on the determination, generating, an augmented reality based visualization associated with the inanimate object, the augmented reality based visualization including at least one indicator of the status. The method further including generating a feedback associated with the inanimate object including the at least one indicator for a user; and transmitting the feedback to a wearable device of the user.

According to an embodiment of the present disclosure, an AR system includes an AR controller including one or more processors and a computer-readable storage medium coupled to the one or more processors storing program instructions, the AR controller being configured to generate an AR environment associated with the inanimate object and the user. The AR system also includes a computer mediated device communicatively connected to the AR controller that is configured to display an AR environment associated with the inanimate object to the user including indications of conditions associated with the inanimate object, and a sensor communicatively connected to the AR controller and/or computer mediated device. The program instructions, when executed by the one or more processors, cause the one or more processors to perform operations including receiving sensor data from a plurality of sensors associated with the inanimate object, the sensor data tracking one or more conditions of the inanimate object; analyzing the sensor data to determine a status of a real world sentiment associated with the inanimate object; based on the determination, generating an augmented reality based visualization associated with the inanimate object including at least one indicator of the status; generating a feedback associated with the inanimate object including the at least one indicator for a user; and transmitting the feedback to a wearable device of the user.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
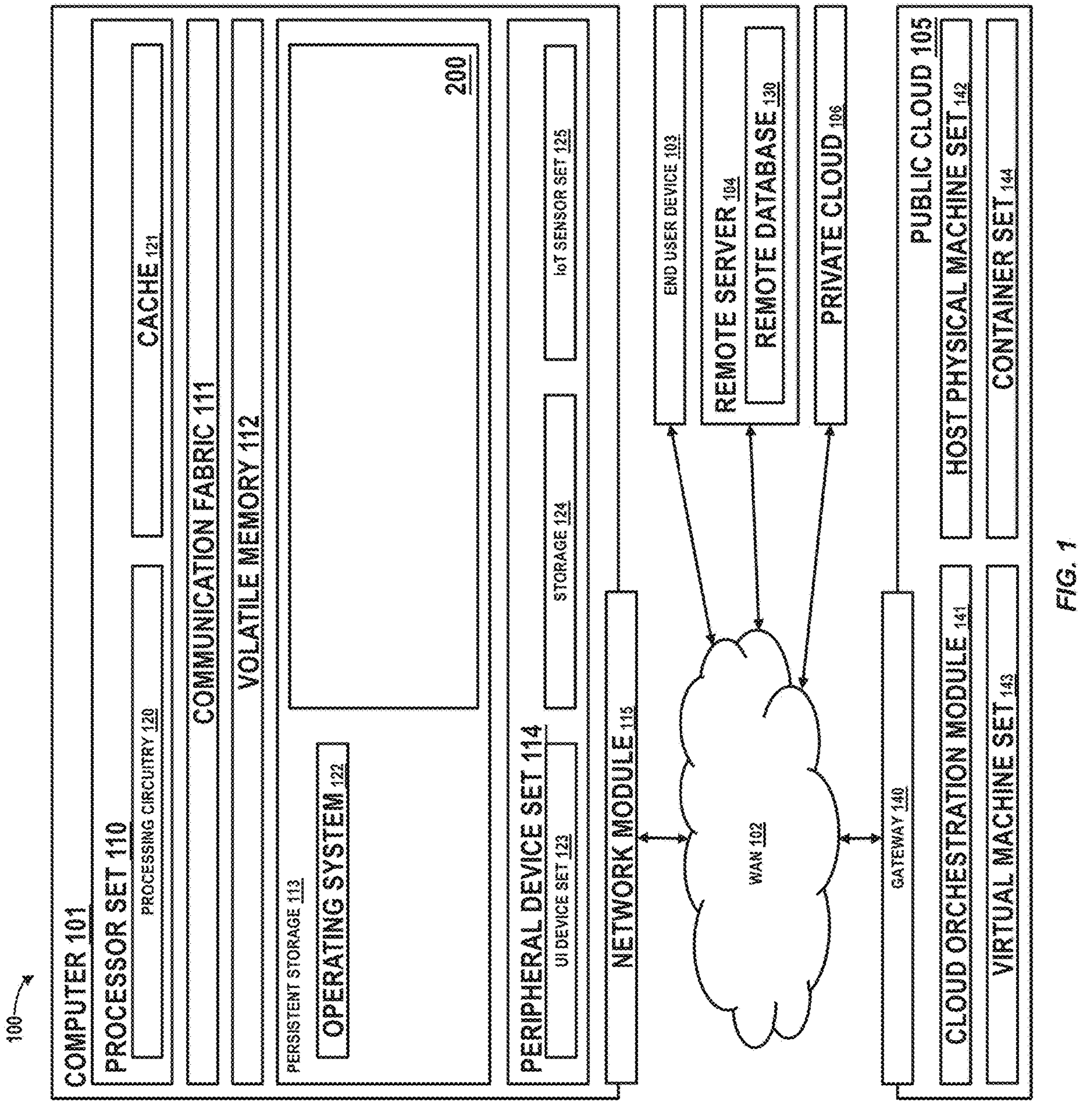
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for visualizing real world sentiments of an inanimate object. Inanimate objects and other applicable possessions are subject to damage, upgrades, repairs, maintenance, etc. The ability of an owner or possessor to ascertain the current status of an inanimate object is dependent upon not only detecting indications of conditions associated with the inanimate object, but also variable factors such as the surroundings/environment of the inanimate object, data specific to users associated with the inanimate object, etc. Augmented Reality (AR) allows the acquiring of collection of data associated with the inanimate object and its environment in order to depict sensory information seamlessly interwoven with the physical world such that it is perceived as an immersive aspect of the real environment (and as further discussed herein). AR technologies (e.g. computer vision, incorporating AR cameras into smartphone applications, object detection/recognition, etc.) have enabled information about the surrounding real world of the user to become interactive, in which the information about the environment and its objects is overlaid on the real world for viewing by a user through a computer mediated device. In addition, present technology allows wearable devices to integrate the ability to receive feedback at flexible electronic apparatuses that are configured to mimic functions of human skin known as electronic skins, allowing wearers to experience tactile sensing based on perceived sentiments associated with other people and things. For example, feedback including haptic-related functions may be felt by the wearer upon an applicable person or thing being affected by a particular sentiment or action. Thus, the present embodiments have the capacity to not only detect indicators and statuses pertaining to real world sentiments associated with inanimate objects, but also visualize said indicators and statuses to users via AR technologies that take into account other various sources of data (e.g. computer vision systems, biological sensor systems, etc.) in order for users to empathize and understand "sentiments" of their inanimate objects. Furthermore, the present embodiments have the capacity to allow users to experience advanced empathizing with their inanimate objects by receiving feedback derived from the indicators and statuses of the inanimate objects at wearable devices including artificial electronic skins configured to receive biological feedback representing the indicators and statuses (e.g. tactile sensing, etc.).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program for visualizing real world sentiments of an inanimate object. Referring now to FIG. 1, a computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113, peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
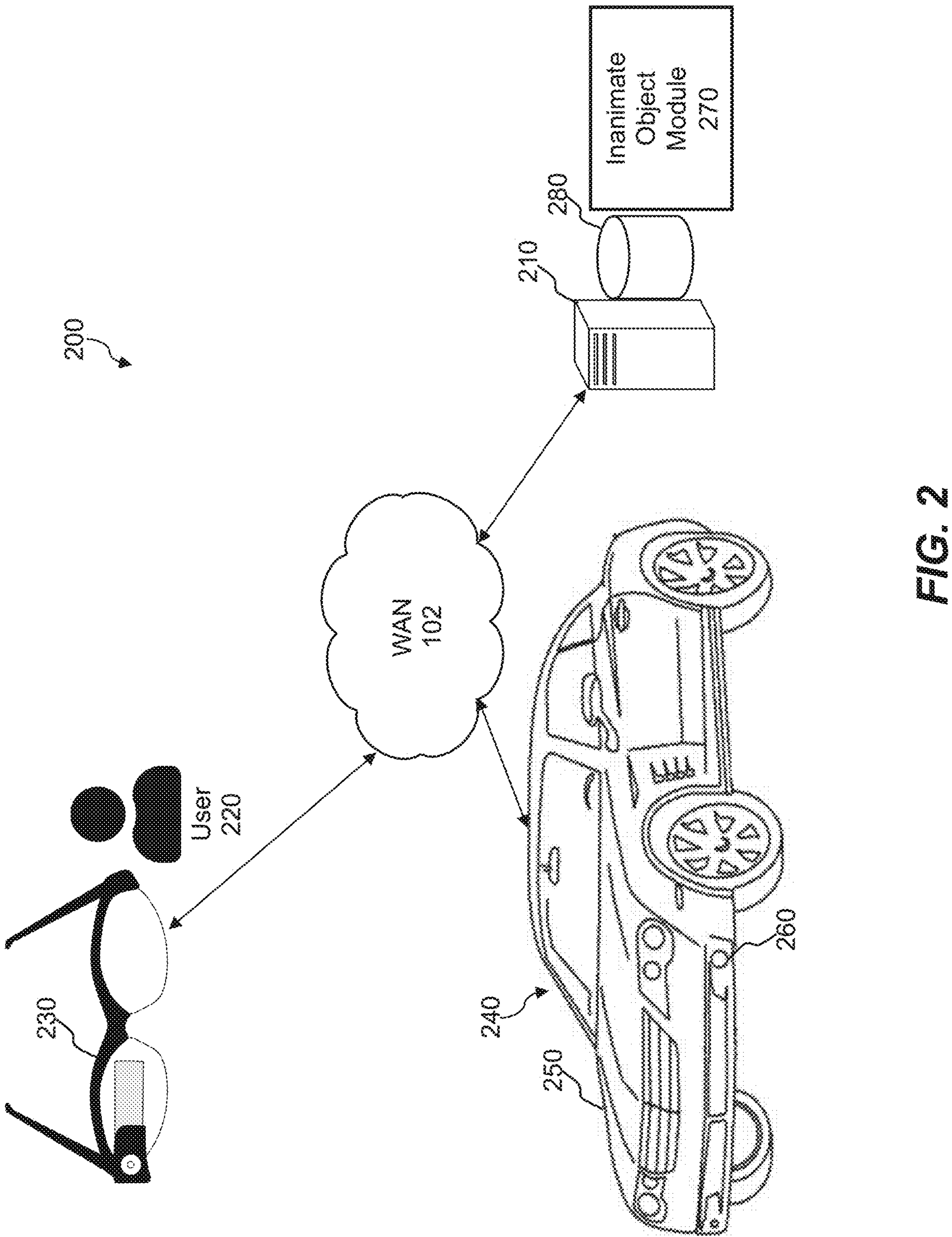
FIG. 2 illustrates a block diagram of an inanimate object sentiment visualization environment, according to an exemplary embodiment.

Referring now to FIG. 2, a functional block diagram of a networked computer environment illustrating an inanimate object sentiment visualization system 200 (hereinafter "system") for collecting sensor data from one or more components of system 200 provided throughout in order to generate visualization of the real world sentiments of inanimate objects. It should be appreciated that FIG. 2 provides only an illustration of one implementation and does not imply any limitations with regard to the environments in which different embodiments may be implemented. Many modifications to the depicted environments may be made based on design and implementation requirements. In some embodiments, system 200 includes a server 210, a user 220 associated with a computing device 230, at least one inanimate object system 240 including an inanimate object 250 and a communicatively coupled sensor system 260 including a plurality of sensors, and an inanimate object module 270 communicatively coupled to server 210, each of the aforementioned components communicatively coupled over WAN 102. In some embodiments, WAN 102 is a communication network (hereinafter "network") and data from the components of system 200 transmitted across the network is stored in database 280.

In another embodiment, inanimate object module 270 may operate on more than one computer, server computer, or some combination of computers and server computers, for example, a plurality of computers communicating across the network with a single server computer. In another embodiment, for example, inanimate object module 270 may operate on a plurality of server computers communicating across the network with a plurality of client computers. Alternatively, inanimate object module 270 may operate on a network server communicating across the network with server 210 and a plurality of client computers.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g. one or more devices) of system 200 may perform one or more functions described as being performed by another set of devices of system 200.

In some embodiments, server 210 is configured to generate a centralized platform accessible by user 220, in which a plurality of user interfaces are provided to computing device 230 for the purpose of viewing, modifying, and analyzing data associated with one or more of user 220, inanimate object system 240, and any other applicable component of system 200 and systems that system 200 is configured to communicate with. For example, system 200 may communicate with a computer vision system in which the combination of data derived from the computer vision system and sensor system 260 allow inanimate object module 270 to ascertain one or more defects, injuries, etc. of inanimate object 250. These defects, injuries, etc. are not only communicated to user 220 via the centralize platform, but also inanimate object module 270 may generate visualizations including AR content representing indicators and statuses of inanimate object 250 derived from the detected defects, injuries, etc. for presentation to user 220.

It should be noted that computing device 230 may be may be, for example, a mobile device, a telephone, a personal digital assistant, a netbook, a laptop computer, a tablet computer, a desktop computer, wearable device, or any type of computing devices capable of running a program, accessing a network, and accessing a database; however in this particular embodiment, computing device 230 is a computer-mediated reality device, such as AR glasses, AR goggles, etc. configured to be worn by user 220 who is presented visualizations including AR content pertaining to at least indicators, statuses, and real world sentiments of inanimate object 250 based on data collected by one or more of server 210, computing device 230, inanimate object system 240, inanimate object module 270, and/or any other applicable computing device associated with user 220 (e.g. wearable device including artificial electronic skin, etc.).

As described herein, an inanimate object is any applicable inorganic item including but not limited to a building, vehicle, computing device, literature, or any other applicable inorganic item; however, in this particular embodiment inanimate object 250 is an autonomous vehicle associated with user 220. Sensor system 260 is allocated among internal and external surfaces of inanimate object 250 allowing the plurality of sensors to receive sensor data including area information associated with the internal and external components of inanimate object 250 along with its surroundings. For example in the instance in which inanimate object 250 is a house/building, the plurality of sensors are allocated among the internal and external components of the house (e.g. infrastructure, fixtures, attachments, etc.) in order to receive sensor data including, but not limited to temperature data, auditory data, lighting data, motion data, haptic data, location data, or any other applicable type of sensor data known to those of ordinary skill in the art. In some embodiments, the plurality of sensors of sensor system 260 include one or more cameras, microphones, internet-of-things (IOT) sensors, weight scales, gas detectors, humidity sensors, accelerometers, gyroscopes, barometers, GPS sensors, thermometers, haptic sensors, biological-based sensors, or any other applicable sensors known to those of ordinary skill in the art.

Inanimate object module 270 is configured to collect and analyze sensor data from inanimate object system 240 and user-specific data associated with user 220 from computing device 230 and/or the applicable computing device associated with user 220, in which user-specific data may include, but is not limited to biological data (e.g. vital signs, electrical activity of muscle tissue, eye movements, etc.), motion data, temperature data, location data, gaze direction data, auditory data, biometric data, emotional state data, haptic data, etc. The sensor data is configured to account for changes in conditions associated with inanimate object 250 over time (e.g. injuries, services, upgrades, improvements, etc.). In some embodiments, server 210 may collect user-specific data from computing device 230 and/or the applicable computing device associated with user 220 in order to generate a user profile configured to be stored in database 280. The user profile may be utilized by inanimate object module 270 in order to generate visualizations of inanimate object 250 based on preferences associated with user 220 (e.g. dimensions, brightness, coloring/shading, etc.). For example, AR content within the visualizations may presented to user 220 based on the direction of the gaze of user 220, the preferred lighting, dimensions, surrounding environment, user preferences, etc. associated with user 220 derived from the user profile. Server 210 may continuously update the user profile with data pertaining to user 220, such as but not limited to social media data derived from social media profiles associated with user 220, activity data derived from calendar/personal scheduler platforms associated with user 220, etc.

As described in greater detail in reference to FIG. 2, inanimate object module 270 is designed to utilize one or more machine learning models to predict indicators and statuses associated with indicators pertaining to inanimate object 250, in which the indicators include but are not limited to an injury, a defect, a repair, an upgrade, a downgrade, a received service, or any other applicable conditions associated with inanimate object 250. A purpose of the indicators and statuses is to inform user 220 of conditions and sentiments pertaining to inanimate object 250; for example, sensor data may indicate that the autonomous vehicle has sustained a dent at a location on the external surface due a detected irregularity in the external surface which may allow a sentiment of pain or unhappiness of the autonomous vehicle to be ascertained by user 220. In some embodiments, the sentiment of pain or unhappiness is derived from a prediction by machine learning module 310 pertaining how user 220 and/or inanimate object 250 would feel regarding the dent, and the feedback signals felt by user 220 on the applicable wearable are generated based on the sentiment. Inanimate object module 270 generates a first visualization including AR content associated with the dent along with a second visualization including AR content associated with a status of the autonomous vehicle pertaining to the dent (e.g. a sad face emoji, emoticon, etc.), the visualizations presented to computing device 230 for viewing by user 220.

Figure 3:
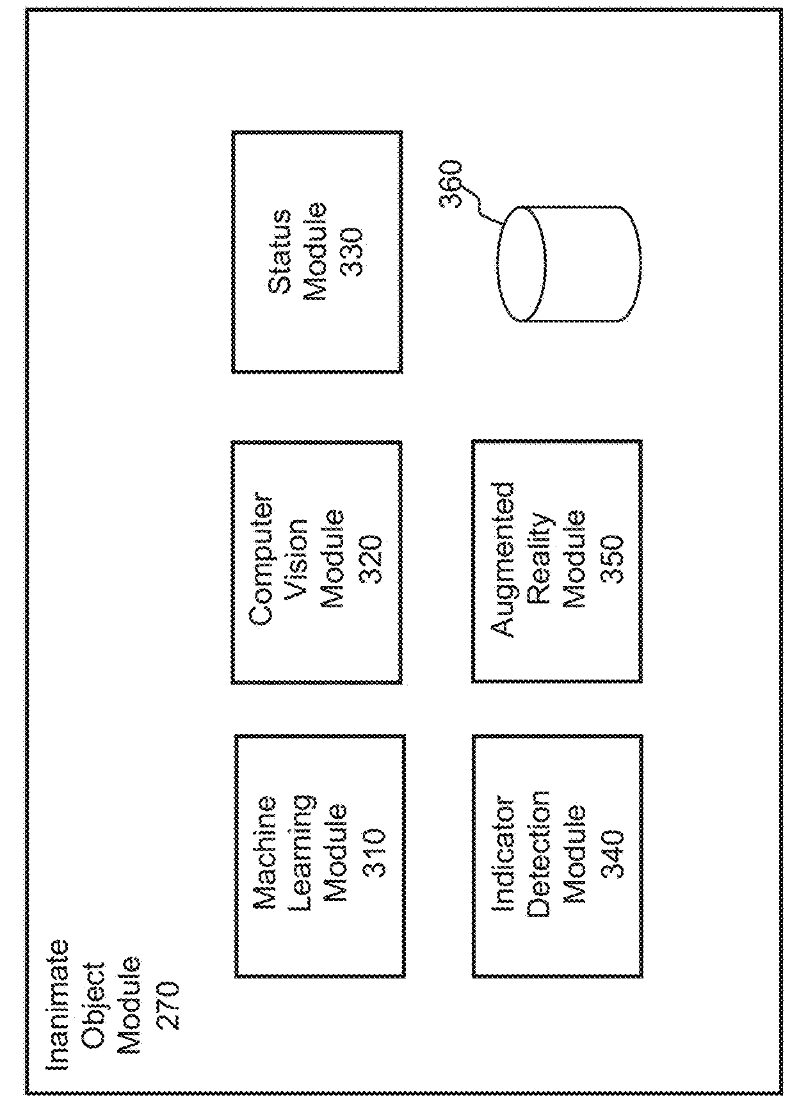
FIG. 3 is an example of components of an inanimate object module of FIG. 1, according to an exemplary embodiment.

Referring now to FIG. 3, inanimate object module 270 is depicted, according to an exemplary embodiment. Inanimate object module 270 includes a machine learning module 310, a computer vision module 320, a status module 330, an indicator detection module 340, an AR module 350, and an inanimate object module database 360.

Machine learning module 310 is configured to use one or more heuristics and/or machine learning models for performing one or more of the various aspects as described herein. In some embodiments, the machine learning models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. In particular, machine learning module 310 generates training datasets derived from the sensor data, user-specific data, and/or data transmitted by server 210 for the one or more machine learning models, in which the machine learning models are configured to generate outputs representing indicators and statuses associated with inanimate object 250. As described herein, the indicators and statuses of inanimate object 250 represent emotions, sentiments, conditions, requirements, and/or any other applicable factors associated with inanimate object 250, as predicted to be experienced by a user 220 when viewed or otherwise experienced. The aforementioned may include but is not limited to sentiments of happiness, sadness, pain, excitement, thirsty (e.g., car needing fuel), uncomfortable (e.g., car being dirty), or any other applicable ascertainable sentiment known to those ordinary skill in the art. The machine learning models may further generate predictions pertaining to user 220, such as sentiments of user 220 based on statements, expressions, and/or movements of user 220 derived from audio data, biological data, muscle activity data (electromyography) collected by computing device 230 or any other applicable computing device associated with user 220 (e.g. mobile device, wearable device, etc.), in which the predictions pertaining to user 220 may be correlated and/or mapped to predictions pertaining to inanimate object 250. Machine learning module 310 is configured to utilize a machine learning model to predict the sentiment of user 220 and map the sentiment to a detected status or indicator of inanimate object 250. For example, the predicted sentiment of user 220 may be anger in response to a scratch/dent on the external surface of inanimate object 250 detected by inanimate object module 270. The output of the machine learning module representing the sentiment of anger is mapped to the detected scratch/dent allowing machine learning module 310 to predict and/or inanimate object module 270 to determine a related status of inanimate object 250 resulting in AR module 350 generating AR content including an angry or sad emoji/emoticon to be included in the AR visualization depicted through computing device 230 to user 220.

Computer vision module 320 is configured to utilize algorithms or techniques that identify and process objects in images and videos. In particular, computer vision module 320 receives computer vision data including images and videos from one or more of server 210, sensor system 260, or any other applicable sources for images and videos pertaining to inanimate object 250 (e.g. monitoring system, security system, etc.). Computer vision trains computers to interpret and understand the received data such as digital image and/or video content, and can include techniques such as machine learning and/or use of machine learning models such as deep learning models (provided by machine learning module 310) to accurately identify and/or classify objects, and possibly react to what it identifies. In some embodiment, one or more computer vision algorithms can break or decompose the original region (images of) into smaller parts, classifying the smaller parts with simpler concepts. One or more computer vision algorithms can also retrieve or receive similar images. In an embodiment, one or more knowledge augmented machine learning algorithms generated by machine learning module 310 can automatically annotate regions. Acquired knowledge about concepts can be used to search for candidate regions to be annotated. It should be noted that the detection and annotation of regions of inanimate object 250 via sensor system 260 working with computer vision module 320 allows tagging of inanimate object metadata to one or more portions of inanimate object 250. For example, inanimate object metadata including one or more of current position, temperature, environment condition (e.g. dirty, burnt, broken, intact, dented, scratched, and/or any other condition or state of any object known in the art), or any other applicable metadata may be tagged to applicable portions of the internal and external surfaces and/or components of inanimate object 250. Inanimate object metadata may be stored in inanimate object module database 360 in a manner in which the inanimate object metadata is correlated to the source of the indicator of inanimate object 250 that it is associated with (e.g. component of inanimate object 250). One or more descriptions relating to the conditions associated with the inanimate object metadata are designed to be presented within the visualizations generated by AR module 350. For example, information pertaining to the indicator may be presented in a text and/or audio format to user 220, or in some instances, said information read aloud to user 220 via an interactive avatar presented with overlays when the visualizations are generated by AR module 350. In some embodiments, numerical values and probability percentages associated with the inanimate object metadata may be depicted within the AR content visualizations generated by AR module 350. For example, based upon a detected dent on the external surface of the autonomous vehicle, inanimate object metadata tagged at the location (also referred to as an "indicator location") of the dent may utilized by AR module 350 to portray to computing device 230 a probability (e.g. a numerical percentage, etc.) indicating the likelihood that the detected dent needs to be repaired, data pertaining to the repairing such as progressive repair updates, percentage pertaining to damage to inanimate object 250 overall, etc. Status module 330 is configured to apply statuses to one or more components of inanimate object 250 (e.g. external surfaces, internal surfaces, features, attachments, etc.) based on analyses performed on data derived from one or more of server 210, sensor system 260, machine learning module 310, and computer vision module 320. It should be noted that a status or state of inanimate object 250 reflecting a real world sentiment is configured to be updated in real-time based on data continuously being received and processed from server 210, sensor system 260, machine learning module 310, and computer vision module 320. A status may change based upon rectification of the associated indicators. For example, a status associated with a dent in the external surface of the autonomous vehicle may change from negative/sad to positive/happy based upon the dent being repaired, in which updated AR content reflecting the updated status is integrated into the visualization generated by AR module 350. Status module 330 ascertains the one or more statuses based on the indicators determined by indicator detection module 340, in which indicator detection module 340 determines the indicator locations among the external and internal surfaces of inanimate object 250 based upon the sensor data and data received from computer vision module 320.

In some embodiments, indicator detection module 340 may be assisted by machine learning module 310 in its determination of indicators of inanimate object 250 by considering outputs of the one or more machine learning models in its determinations. For example, machine learning module 310 may predict, via the one or more machine learning models, sentiments of user 220 based on their reaction to previous indicators determined by indicator detection module 340. Continuing with the previous dent example, the facial expressions derived from muscle activity data (e.g. electromyography) and other applicable user-specific data allow machine learning module 310 to predict sentiments and reactions of user 220 to the dent (e.g. angry, stressed, sad, etc.), in which indicator detection module 340 integrates the prediction in the determination of the indicator along with the visualization of the indicator of the dent. Based upon this, AR module 350 augments a live view of the environment including inanimate object 250 displayed on computing device 230 seen through the perspective of user 220.

In a preferred embodiment, AR module 350 augments a live view from the perspective of user 220 in which the visualization of both the status and the associated indicators are accomplished by AR content being overlaid on the live view of the environment around and/or inside inanimate object 250 to provide an augmented reality display to user 220. AR module 350 may generate the visualization in a manner that draws attention to the location of the objects of interest (e.g. source of the indicators) in the live view. Visualizations may include overlay elements which may be generated from inanimate object metadata, reference data (e.g. exhaustive list of issues/defects/etc. of inanimate object 250), or any other applicable data derived from processing of the sensor data. In some instances, the overlays are generated as translucent representations of a component being imaged. The overlays may also be generated as outlines or other representations of the component, in varying views of the component. The visualizations may be presented as part of the augmented instruction set.

Figure 4:
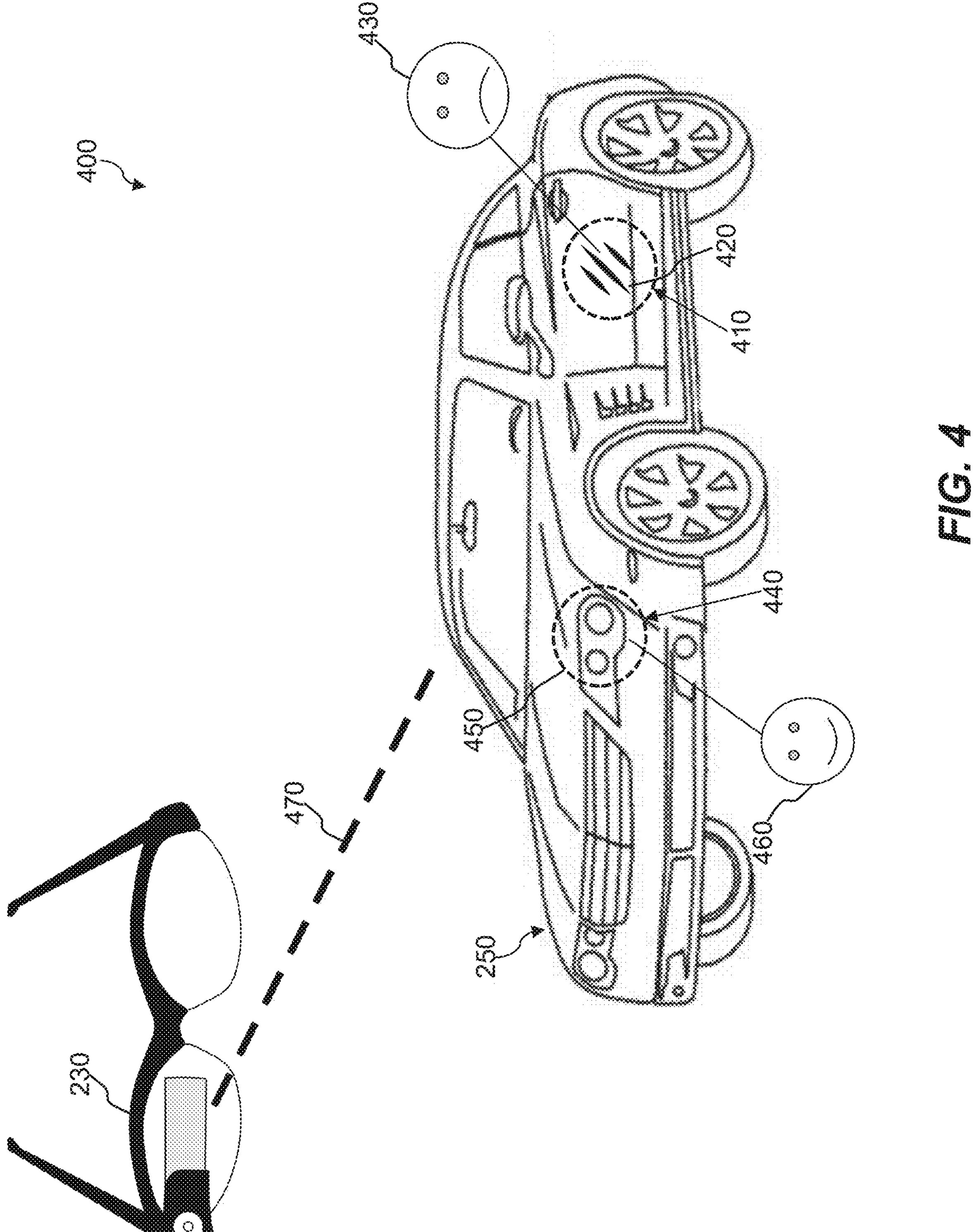
FIG. 4 is a pictorial representation of projected real world sentiments of an inanimate object viewed by an augmented reality device, according to an exemplary embodiment.

Referring now to FIG. 4, a visualization of projected real world sentiments 400 of inanimate object 250 is illustrated, according to an exemplary embodiment. It should be noted that visualization 400 is an exemplary live view of inanimate object 250 from the perspective of user 220 displayed via computing device 230. For example, visualization 400 includes an overlay of the live view including a first indicator 410 representing a scratch 420 on the exterior surface of inanimate object 250 along with a first status 430 determined by status module 330 and a second indicator 440 representing a repaired headlight 450 along with a second status 460 determined by status module 330, in which status module 330 determines statuses 430 and 460 based on first indicator 410 and second indicator 440, respectively. Statuses 430 and 460 are configured to be represented as emojis, emoticons, icons, pictures, pictograms, or any other applicable visual representation expressing an idea, sentiment, or expression of user 220 or inanimate object 250. For example, first status 430 depicts a sad face emoji reflecting the sentiment of inanimate object 250 pertaining to scratch 420, and second status 460 depicts a happy face emoji reflecting the sentiment of inanimate object 250 pertaining to repaired headlight 450. Additionally, first indicator 410 and second indicator 440 may pertain to the direct interactions between user 220 and inanimate object 250, in which indicator detection module 340, with or without assistance of computer vision module 320, analyzes one or more actions between user 220 and inanimate object 250 in order to ascertain the sentiments of inanimate object 250. For example, in the instance in which inanimate object 250 is an autonomous vehicle, if user 220 slams the vehicle door with excessive force then indicator detection module 340 determines that first indicator 410 is a sentiment of pain resulting in status module 330 determining that the status of inanimate object 250 is injured and the status being reflected by AR module 350 in the visualization accordingly.

In some embodiments, generation of visualization 400 by AR module 350 is based upon a detected direction of the visual focus 470 of user 220. In various embodiments, computing device 230 includes a gaze point tracker that can identify the eye focus of the user along with peripheral vision, or focus angle, of user 220 in order for inanimate object module 270 to determine the direction of the visual focus 470. In addition, computing device 230 can comprise an internal compass to identify direction of the visual focus 470. Determining direction of visual focus 470 allows inanimate object module 270 to instruct AR module 350 of which indicators identified by indicator detection module 340 along with associated statuses determined by status module 330 should be visualized. For example, inanimate object module 270 determining direction of the visual focus 470 based on user 220 looking in the direction of the location of first indicator 410 results in AR module 350 generating the visualization reflecting first status 430 and in various embodiments, presenting the applicable inanimate object metadata as well. In some embodiments, inanimate object module 270 may utilize one or more alignment components communicatively coupled to server 210 (receiving data from computing device 230 or any other applicable computing device associated with user 220) and computer vision module 320 in order to confirm if first indicator 410 and second indicator 440 are aligned with direction of the visual focus 470.

Figure 5:
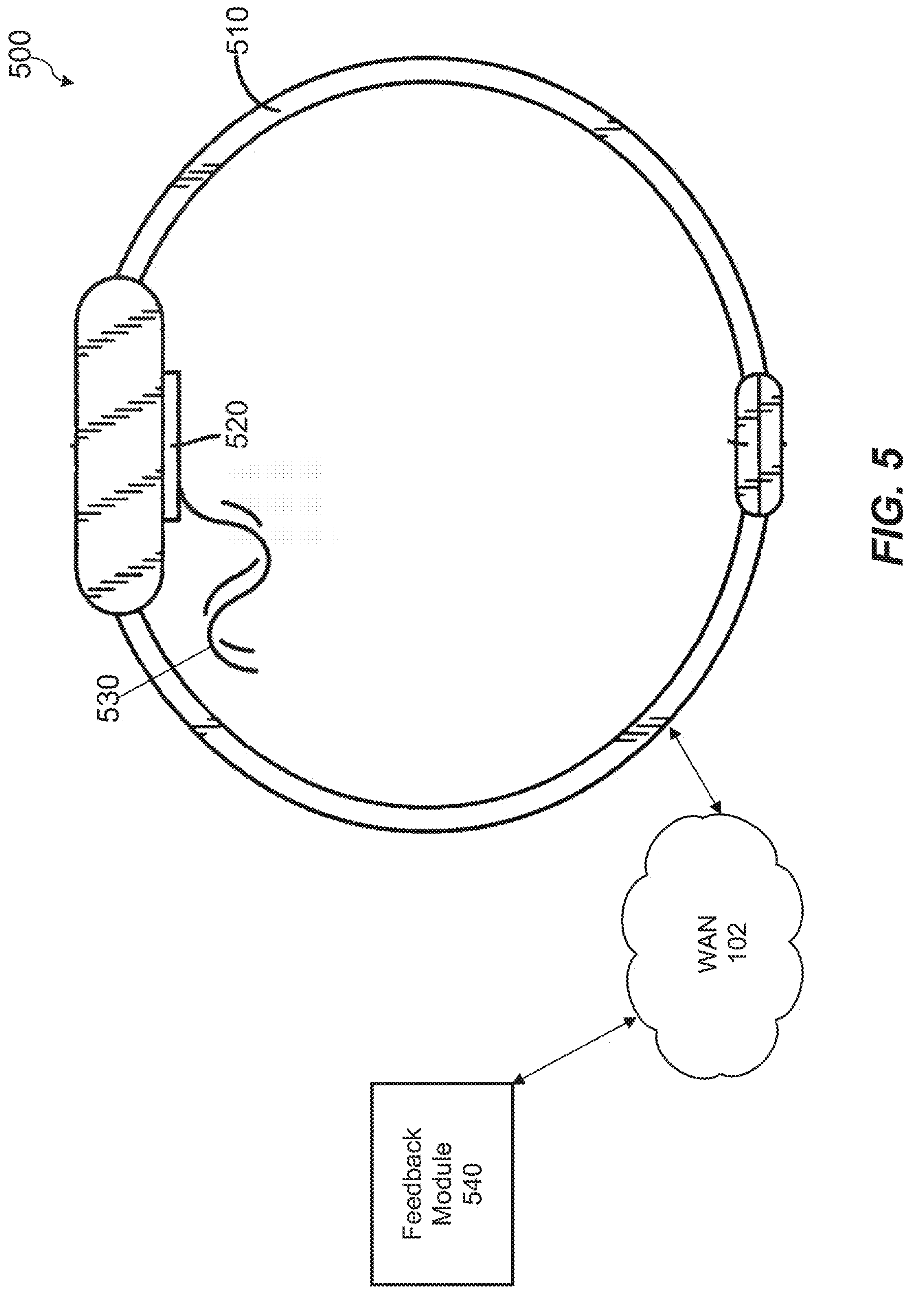
FIG. 5 illustrates an inanimate object sentiment feedback system including an artificial electronic skin applied to a wearable device receiving feedback derived from projected real world sentiments of the inanimate object, according to an exemplary embodiment.

Referring now to FIG. 5, an inanimate object sentiment feedback system 500 is depicted, according to an exemplary embodiment. Feedback system 500 includes a wearable device 510 including an artificial electronic skin 520 configured to receive a plurality of electric feedback signals 530 generated by a feedback module 540, in which feedback module 540 is communicatively coupled to wearable device 510 and inanimate object module 270 over the network. Wearable device 510 may be any applicable wearable technology, fashion technology, smart-wear, tech togs, skin electronics, fashion electronics, or any other smart electronic devices designed to be worn close to and/or on the surface of the skin. Artificial electronic skin 520 may be any assembly, implant, tissue, surface, etc. configured to receive electric signals (e.g. haptic signals) known to those of ordinary skill in the art. It should be noted that feedback module 540 generates electric feedback signals 530 based on the statuses and indicators associated with inanimate object 250 reflecting its real world sentiments and sentiments. For example, if an indicator associated with inanimate object 250 is a scratch on the exterior surface of inanimate object 250 then feedback module 540 generates electric feedback signals 530 configured to be received at wearable device 510 to mimic a scratching, tingling, vibrating, etc. sensation emitted through electric feedback signals 530 and felt by user 220 via artificial electronic skin 520 in order for user 220 to empathize with the sentiment of inanimate object 250. In another example, in the instances in which user 220 slams a door with excessive force, feedback module 540 generates electric feedback signals 530 configured to provide a vibrating motion at artificial electronic skin 520 to symbolize that inanimate object 250 is in pain.

In some embodiments, electric feedback signals 530 may include instructions for wearable device 510 to perform one or more actions reflecting a status of inanimate object 250. For example upon inanimate object module 270 determining a positive/happy status associated with inanimate object 250, feedback module 540 may generate electric feedback signals 530 including instructions to emit a green light at an applicable light source of wearable device 510 and/or to apply heat to the artificial electronic skin 520. In addition, feedback module 540 is further configured to generate electric feedback signals 530 based on improvements, upgrading, healing, etc. experience by inanimate object 250. For example, electric feedback signals 530 may emit positive/happy vibrations at artificial electronic skin 520 upon inanimate object 250 receiving an improvement service, such as a car wash in the instance in which inanimate object 250 is an autonomous vehicle or a power cleaning in the instance in which inanimate object 250 is a building/house.

Figure 6:
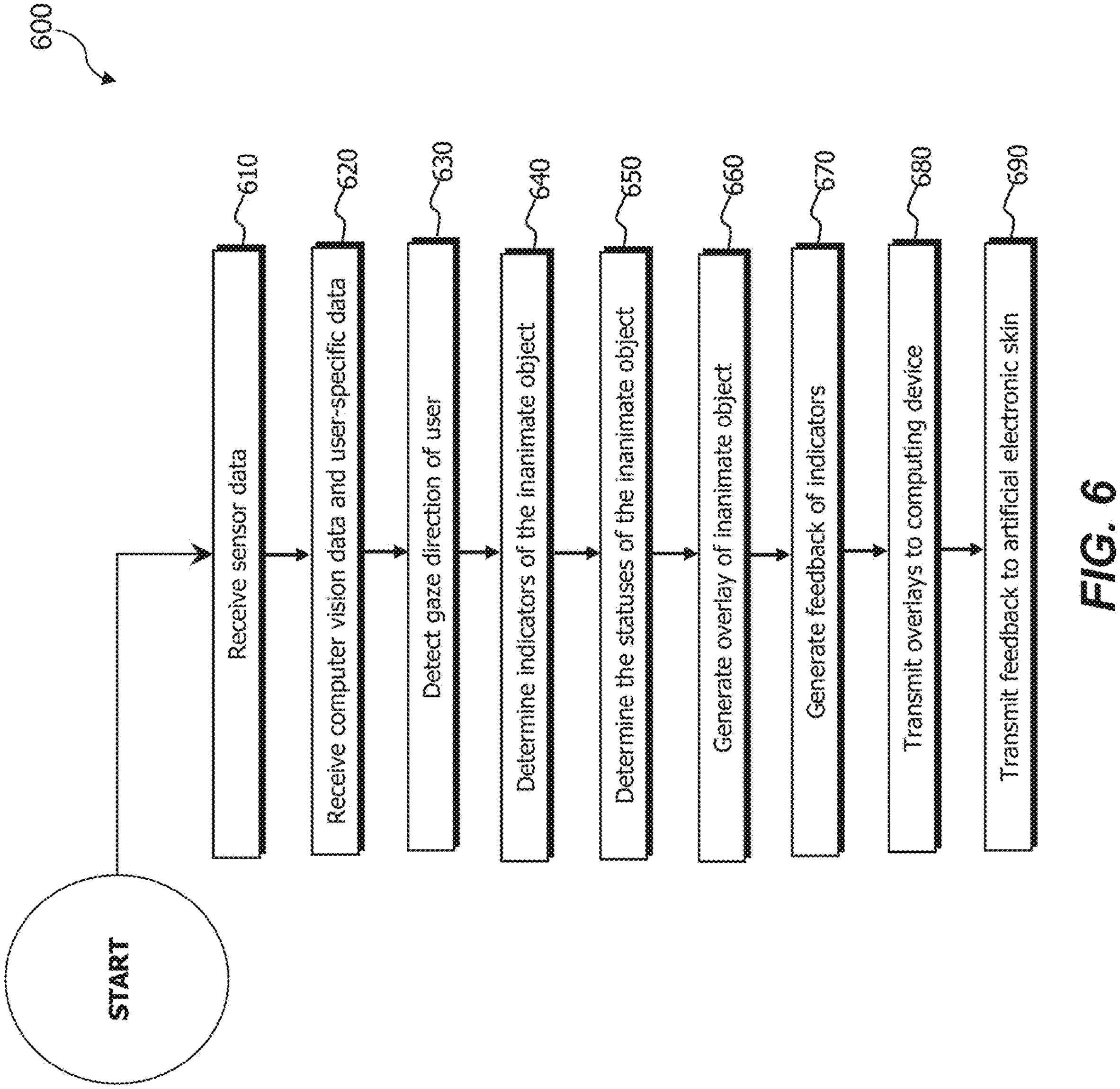
FIG. 6 illustrates a flowchart depicting a method for empathizing real world sentiments of an inanimate object, according to an exemplary embodiment.

With the foregoing overview of the example architecture, it may be helpful now to consider a high-level discussion of an example process. FIG. 6 depicts a flowchart illustrating a computer-implemented process 600 for representing real world sentiments of an inanimate object, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of 600, sensor system 260 receives sensor data associated with inanimate object 250. In some embodiments sensor data includes area information associated with the internal and external components of inanimate object 250 along with its surroundings. Sensor data may further include video data, image data, sound data, sonar data, LIDAR data, temperature data, location data, or any other applicable type of data configured to be acquired by one or more sensors known to those of ordinary skill in the art. The received sensor data may be classified by machine learning module 310 and tagged with inanimate object metadata based upon one or more of the location the sensor data was received from (e.g. right exterior side of the autonomous vehicle, etc.), the type of sensor the sensor data is derived from (e.g. accelerometer, gyroscope, etc.), or any other applicable factor for applying metadata. It should be noted that one of the purposes of collecting the sensor data is to ascertain one or more conditions associated with inanimate object 250 for the purpose of tracking changes to the one or more conditions such as but not limited to defects, repairs, upgrades, services, etc. As sensor data is continuously being collected it is being transmitted to inanimate object module 270 over the network.

At step 620 of 600, computer vision module 320 collects computer vision data and inanimate object module 270 collects user-specific data associated with user 220. In some embodiments, computer vision data may further include crowd sourcing data derived from applicable crowd-sourcing platforms in order to optimally ascertain relevant environment data associated with inanimate object 250. User-specific data is continuously being collected by computing device 230, any other applicable computing device associated with user 220 (e.g. wearable device 510), and user inputs provided by user 220 to server 210 via the centralized platform. The combination of sensor data, computer vision data, and user-specific data may be used as sources for training data sets utilized by the one or more machine learning models operated by machine learning module 310.

At step 630 of 600, inanimate object module 270 detects the gaze direction of user 220. In some embodiments, inanimate object module 270 communicates with computing device 230 which may include a gaze point tracker and an internal compass that can identify the eye focus along with peripheral vision, or focus angle, of the user 220. The gaze point tracker and internal compass transmit gaze point tracking data associated with user 220 to inanimate object module 270 in order for inanimate object module 270 the exact direction and location of inanimate object 250 that user 220 is focusing on. Inanimate object module 270 utilizes the determination of gaze direction to target an area of inanimate object 250 within the gaze direction that includes one or more indicators. In some embodiments, one or more of collected sensor data, computer vision data, and user-specific data may be utilized confirm the gaze direction of user 220 in order to confirm the target area of inanimate object 250 in which AR module 350 generate the visualizations for.

At step 640 of 600, inanimate object module 270 determines the indicators of inanimate object 250. The indicators may be ascertained by inanimate object module 270 based on analyses performed by one or more of machine learning module 310, computer vision module 320, and indicator detection module 340 based on one or more of collected sensor data, computer vision data, and user-specific data. In some embodiments, indicators may further be ascertained by inanimate object module 270 based on data received from server 210. For example in the instance in which server 210 is communicatively coupled to the autonomous vehicle, server 210 may actively track the fuel level associated with the autonomous vehicle resulting in indicator detection module 340 determining an indicator relating to low fuel upon inanimate object module 270 determining that the gaze direction of user 220 is aligned with the location of the autonomous vehicle that includes the fuel tank.

At step 650 of 600, status module 330 determines the statuses of a real world sentiment associated with inanimate object 250. In a preferred embodiment, status module 330 determines the statuses of inanimate object 250 based on the indicators determined by inanimate object module 270, in which a status may be generated for each respective indicator or for the indicators collectively. For example, if multiple components of inanimate object 250 have been repaired, serviced, and/or upgraded then, status module 330 determines that the overall status of inanimate object 250 is happy. However, if inanimate object 250 is dirty and one or more components of inanimate object 250 are in need of service or repair then status module 330 determines that the overall status of inanimate object 250 is sad and/or injured.

At step 660 of 600, AR module 350 generates visualizations of overlays representing the sentiments of inanimate object 250. The overlays comprise AR content selected based upon the detected indicators and determined statuses associated with inanimate object 250, in which AR content includes visual, auditory, haptic, somatosensory (i.e., a sensation such as pressure, pain, or warmth), etc. data derived from the detected indicators and determined statuses. For example, AR content may include avatars having the form of a human expressing the sentiments of inanimate object 250, although there are many other forms that avatars could take. For example, the avatar forms can be non-human; animal, machine, fantasy creature, etc.; stationary or mobile. AR module 350 is designed to generate the overlays in a manner that accounts for the surrounding environment of inanimate object 250 from the perspective of user 220, in which AR module 350 generates the visualization in a manner that draws the attention of user 220 to the location of the relevant indicators and the statuses associated with the indicators.

At step 670 of 600, feedback module 540 generates the feedback associated with at least one indicator of inanimate object 250. It should be noted that feedback module 540 generates the feedback in the form in electric feedback signals 530 configured to be received at artificial electronic skin 520, in which electric feedback signals 530 are configured to be representations of sentiments of inanimate object 250 applied to user 220 donning wearable device 510. Application of electric feedback signals 530 at artificial electronic skin 520 allow user 220 to feel both positive and negative sentiments of inanimate object 250, in which electric feedback signals 530 may be updated by feedback module 540 based upon a detected change or update to an indicator or status being transmitted by inanimate object module.

At step 680 of 600, AR module 350 transmits the overlays to computing device 230 for presentation to user 220. Overlays are presented to user 220 as visualizations of an augmented reality interface seamlessly interwoven with the physical world such that the information is perceived as an immersive aspect of inanimate object 250 included in the real environment. AR module 350 may modify the one or more images/videos by changing the dimensions, aspect ratios, or orientation. AR module 350 may further crop or reduce an image/video size to be positioned within a display device as a split-screen or side by side presentation along with other images/videos or information, such as information derived from the inanimate object metadata (e.g. specific details related to the sensor data and/or detected indicators). AR module 350 modifies the one or more images/videos by changing values for one or more of a hue, a saturation, a brightness, a luminance, and an opacity based on data derived from the user profile or previous reactions of user 220 to previously generated visualizations. AR module 350 may extract an outline, a portion of an image, or a portion of a video stream. In such embodiments, AR module 350 may generate a new image, such as an outline or blueprint, to overlay on an image or video stream depicting a same portion of inanimate object 250.

At step 690 of 600, feedback module 540 transmits the feedback to wearable device 510. Electric feedback signals 530 are electrical signals emitted from artificial electronic skin 520 representing one or more sentiments associated with the status or indicator. In some embodiments, electric feedback signals 530 are emitted simultaneously with the presentation of the AR visualizations presented to computing device 230 allowing user 220 to feel the sentiments of inanimate object 250 at wearable device 510 at the same time that user 220 is viewing indicators and statuses of inanimate object 250 within the augmented reality display. Electric feedback signals 530 include one or more of notifications (e.g. push notifications, etc.), electrical impulses, air pressure, mechanical pressure, vibration, and/or any other applicable feedback signals known to those of ordinary skill of the art.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for representing real world sentiments of an inanimate object comprising:

receiving, by a computing device, sensor data from a plurality of sensors associated with the inanimate object, the sensor data tracking one or more conditions of the inanimate object;

analyzing, by the computing device, the sensor data to determine a status of a real world sentiment associated with the inanimate object and a plurality of inanimate object metadata tagged to one or more portions of the inanimate object;

wherein the status of the real world sentiment comprises a prediction associated with a user derived from one or more machine learning models;

based on the determination, generating, by the computing device, an augmented reality based visualization associated with the inanimate object derived from the determined status, the augmented reality based visualization comprising at least one indicator of the status correlated to the prediction and the plurality of inanimate object metadata;

generating, by the computing device, a feedback associated with the inanimate object comprising the at least one indicator for the user; and transmitting, by the computing device, the feedback to a wearable device of the user.

2. The computer-implemented method of claim 1, wherein the at least one indicator is one or more of an injury, a defect, a repair, an upgrade, a downgrade, or a received service associated with the inanimate object.

3. The computer-implemented method of claim 1, wherein receiving the sensor data further comprises:

communicating, by the computing device, with a computer vision system to receive a plurality of computer vision data associated with the inanimate object; and communicating, by the computing device, with the wearable device in order to receive a plurality of user-specific data associated with the user;

wherein the plurality of computer vision data and user-specific data are utilized by the computing device to determine the status.

4. The computer-implemented method of claim 3, wherein analyzing the sensor data further comprises:

determining, by the computing device, a direction of visual focus of the user from the user-specific data;

wherein the at least one indicator pertains to the one or more portions of the inanimate object that is within the direction of visual focus.

5. The computer-implemented method of claim 1, wherein the feedback is a plurality of electrical signals representing a sentiment associated with the at least one indicator;

wherein the plurality of electrical signals comprises one or more of electrical impulses, air pressure, mechanical pressure, and vibration.

6. The computer-implemented method of claim 1, wherein the wearable device comprises an electronic artificial skin configured to apply one or more feedback actions to the user.

7. The computer-implemented method of claim 6, wherein a receiving location for the electronic artificial skin to receive the feedback is based on an indicator location of the inanimate object associated with the at least one indicator.

8. A computer program product for representing real world sentiments of an inanimate object, the computer program product comprising a computer readable storage medium having program instructions embodied therewith, wherein the computer readable storage medium is not a transitory signal per se, the program instructions being executable by a processor to cause the processor to perform a method comprising:

receiving sensor data from a plurality of sensors associated with the inanimate object, the sensor data tracking one or more conditions of the inanimate object;

analyzing the sensor data to determine a status of a real world sentiment associated with the inanimate object and a plurality of inanimate object metadata tagged to one or more portions of the inanimate object;

wherein the status of the real world sentiment comprises a prediction associated with a user derived from one or more machine learning models;

based on the determination, generating an augmented reality based visualization associated with the inanimate object derived from the determined status, the augmented reality based visualization comprising at least one indicator of the status correlated to the prediction and the plurality of inanimate object metadata;

generating a feedback associated with the inanimate object comprising the at least one indicator for the user; and transmitting the feedback to a wearable device of the user.

9. The computer program product of claim 8, wherein the at least one indicator is one or more of an injury, a defect, a repair, an upgrade, a downgrade, or a received service associated with the inanimate object.

10. The computer program product of claim 8, wherein receiving the sensor data further comprises:

communicating with a computer vision system to receive a plurality of computer vision data associated with the inanimate object; and communicating with the wearable device in order to receive a plurality of user-specific data associated with the user;

wherein the plurality of computer vision data and the plurality of user-specific data are utilized to determine the status.

11. The computer program product of claim 8, wherein analyzing the sensor data further comprises:

determining a direction of visual focus of the user from the plurality of user-specific data;

wherein the indicator pertains to the one or more portions of the inanimate object that is within the direction of visual focus.

12. The computer program product of claim 8, wherein the feedback is a plurality of electrical signals representing a sentiment associated with the at least one indicator;

wherein the plurality of electrical signals comprises one or more of electrical impulses, air pressure, mechanical pressure, and vibration.

13. The computer program product of claim 8, wherein the wearable device comprises an electronic artificial skin configured to apply one or more feedback actions to the user.

14. The computer program product of claim 13, wherein a receiving location for the electronic artificial skin to receive the feedback is based on an indicator location of the inanimate object associated with the at least one indicator.

15. A computer system for representing real world sentiments of an inanimate object, the computer system comprising:

one or more processors;

one or more computer-readable memories;

program instructions stored on at least one of the one or more computer-readable memories for execution by at least one of the one or more processors, the program instructions comprising:

program instructions to receive sensor data from a plurality of sensors associated with the inanimate object, the sensor data tracking one or more conditions of the inanimate object;

program instructions to analyze the sensor data to determine a status of a real world sentiment associated with the inanimate object and a plurality of inanimate object metadata tagged to one or more portions of the inanimate object;

wherein the status of the real world sentiment comprises a prediction associated with a user derived from one or more machine learning models;

based on the determination, program instructions to generate an augmented reality based visualization associated with the inanimate object derived from the determined status, the augmented reality based visualization comprising at least one indicator of the status correlated to the prediction and the plurality of inanimate object metadata;

program instructions to generate a feedback associated with the inanimate object comprising the at least one indicator for the user; and program instructions to transmit the feedback to a wearable device of the user.

16. The computer system of claim 15, wherein the at least one indicator is one or more of an injury, a defect, a repair, an upgrade, a downgrade, or a received service associated with the inanimate object.

17. The computer system of claim 15, wherein program instructions to receive sensor data further comprise:

program instructions to communicate with a computer vision system to receive a plurality of computer vision data associated with the inanimate object; and program instructions to communicate with the wearable device in order to receive a plurality of user-specific data associated with the user;

wherein the plurality of computer vision data and user-specific data are utilized to determine the status.

18. The computer system of claim 15, wherein program instructions to analyze the sensor data further comprise:

program instructions to determine a direction of visual focus of the user from the plurality of user-specific data;

wherein the at least one indicator pertains to the one or more portions of the inanimate object that is within the direction of visual focus.

19. The computer system of claim 15, wherein the wearable device comprises an electronic artificial skin configured to apply one or more feedback actions to the user.

20. The computer system of claim 19, wherein a receiving location for the electronic artificial skin to receive the feedback is based on an indicator location of the inanimate object associated with the at least one indicator.

* * * * *